May 10, 1949. J. A. TRAME, JR 2,470,004
GAUGING DEVICE
Filed Aug. 17, 1945
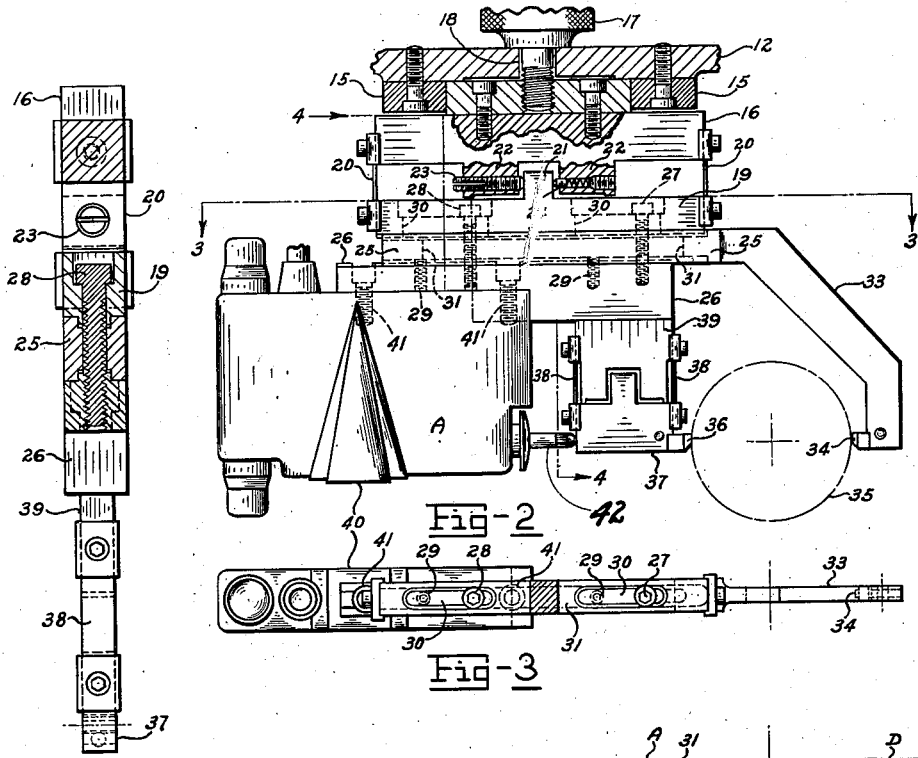
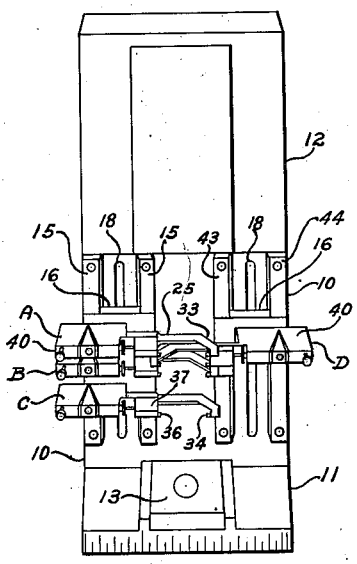
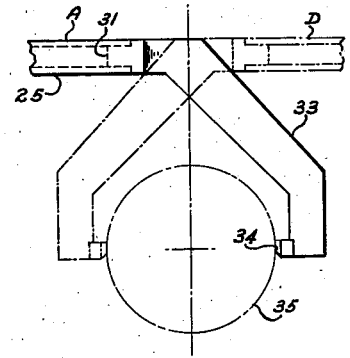
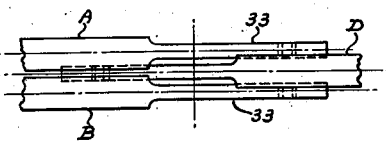
INVENTOR
J. A. Trame Jr.
BY
Edward J. Neif
ATTORNEY Patented May 10, 1949

2,470,004

UNITED STATES PATENT OFFICE 2,470,004

GAUGING DEVICE

Joseph A. Trame, Jr., Dayton, Ohio, assignor to The Sheffield Corporation, Dayton, Ohio, a corporation of Ohio Application August 17, 1945, Serial No. 610,966

4 Claims. (Cl. 33—147)

This invention relates to gauging apparatus for accurately gauging sizes of measured parts of various dimensions.

One object of the invention is the provision of a gauging apparatus for gauging a dimension of a workpiece and embodying a plurality of work engaging members which are readily adjustable with respect to one another and with respect to a common carrier to provide variation in spacing for workpieces of different sizes while maintaining the axis of the workpiece in a definite position with respect to the support on which the carrier is arranged.

Another object is the provision of a gauging apparatus having a series of movable carriers adjustably mounted on a support to provide variation in the spacing of the carriers, the carriers moving in direction transverse of the direction in which they are adjustable and each having provision for connection to a pair of bars having work engaging portions so that the bars may be readily set in different positions with respect to the carrier to permit gauging of dimensions of different sizes.

Another object is the provision of a gauging apparatus having a support on which workpieces of different sizes can be mounted, a series of movable carriers being adjustably mounted on the support and each carrier providing for the convenient adjustment and support of a plurality of work engaging members, the gauging parts being compactly arranged for close grouping of the carriers.

Other objects and advantages of the invention will be apparent from the following description, the appended claims, and the accompanying drawing, in which:

Fig. 1 is a perspective view of gauging apparatus embodying the present invention;

Fig. 2 is a top plan view of one of the gauging assemblies, the back portion of the support being shown in horizontal section;

Fig. 3 is a vertical section on the line 3—3 of Fig. 2;

Fig. 4 is a vertical section on the line 4—4 of Fig. 2;

Fig. 5 is a detailed view showing a pair of adjacent work engaging arms on opposed gauging assemblies; and Fig. 6 is a fragmentary front elevation of several of the work engaging portions of different gauging assemblies.

Referring more particularly to the drawing, in which the same parts are designated in the various views by the same reference numerals, 10 represents a support having a horizontal base portion 11 and an upstanding back member 12. The base portion carries a movable work holding slide 13 on which a shell or other workpiece to be gauged can be arranged so that its axis extends vertically in a particular form of gauging apparatus herein illustrated. The slide 13 can be moved out from the back member, the work applied to the slide and the slide then moved towards the back member into work gauging position, in the gauging operation. The workpiece may take any one of a large number of shapes or forms, although the invention as herein illustrated, is in a form particularly adapted for gauging external measurements of an elongated workpiece, at different points along the workpiece axis.

Secured to the back member 12 are two spaced guide strips 15 forming a slideway in which an adjustable block 16 is arranged. A thumb screw 17 extends through a vertical slot 18 in the back member and is threaded in the block 16, as shown in Fig. 2, so the block can be fixed on the support in any desired position of adjustment at different heights above the base portion 11.

The block 16 carries a movable carrier 19 by means of a pair of parallel spaced spring blades 20. One end of each of these blades is fixed to the block 16, and the other end is fixed to the carrier 19, thus mounting the carrier for yielding movement in the direction of its length. A projection 21 on the carrier is arranged between a pair of spaced lugs 22 on the block and is normally held against a stop screw 23 carried by one of these lugs by means of a spring pressed stud 24 in the other lug.

The carrier 19 is fixed in an adjustable manner to two bars 25 and 26 by means of a pair of screws 27 and 28 which project through openings in the carrier and in the bar 25 and are threaded in the bar 26. The bar 26 has additional threaded portions as shown at 29, it being understood that each of the screws 27 and 28 can be engaged with one or the other threaded portions in the bar. The upper portions of the screws pass through elongated slots 30 in the carrier and through an elongated slot 31 in the bar 25. The upper and lower sides of the bar 25 have projecting portions that interfit with corresponding grooves in the lower side of the carrier 19 and the upper side of the bar 26, as will be apparent from Fig. 4. As shown in Figs. 3 and 4, the two bars are of comparatively small cross sectional area, both being elongated in a direction parallel to the length of the carrier. It will be apparent that, by loosening the screws 27 and 28, the bar 25 can be moved to either the right or the left within the limits permitted by the slot 31, and the bar 26 can also be adjusted to either the right or the left as shown in Fig. 2, within the limits of the slot 30. When the screws 27 and 28 are tightened, both bars will be fixed securely on the carrier and be yieldingly movable with the carrier in the direction of the length of the bars.

Projecting from one end of the arm 25 is a leg 33 having a work engaging tip 34 adapted to contact one side of a workpiece which has been illustrated at 35. The other side of the workpiece is engaged by a work gauging tip 36 on a movable part 37 which is carried by a pair of parallel spring blades 38 on a projecting portion 39 of the bar 26. The manner in which the part 37 is mounted for yielding movement on the bar 26 is similar to the mounting of the carrier 19 on the block 16. This part 37 has an operative connection to a movable plunger 42 of a gauging device 40 which is held by screws 41 on the bar 26. The gauging device 40 is preferably of the character shown in Patent 2,254,812, granted September 2, 1941, and is adapted for the operation of a suitable indicating means to show whether or not the dimension gauged departs from a desired size standard.

From the above description it will be clear that if the dimension to be checked by the two work engaging portions of the two bars is less than that indicated, the carrier 19 can be removed by loosening its connections to the spring blades 20, the screws 27 and 28 can be loosened, and the bar 25 moved towards the left, the bar 26 being moved a corresponding distance towards the right with respect to carrier 19, so that the workpiece of smaller size can be gauged with its axis in exactly the same position.

Different points along the length of the workpiece can be gauged, inasmuch as there are a series of blocks similar to the block 16, and a series of gauging units, one carried by each block. Thus, as shown in Fig. 1, a vertical series of three of these gauging units A, B, and C are held on carriers arranged between the guide strip 15 at one side of the apparatus. At the other side of the apparatus are additional guide strips 43 and 44 providing the support for one or more gauging units such as the unit D, similar to the gauging unit first described although its gauging tips are arranged at the left instead of the right of the unit. Since the gauging units are of a symmetrical form as viewed from the front of the apparatus, it will be apparent that the various parts of these units are interchangeable merely by inverting them, whether they are used in the right-hand series or left-hand series.

The arm 33 that projects from the bar 25 is of reduced vertical dimension as compared with the bar itself, and the vertical dimension of the part 37 and the projecting portion of the bar 26 is also of reduced size as compared to bar 26 so that even if a pair of superposed gauging units are close together as indicated at A and B, Fig. 6, it is possible to check a dimension between the central planes of these two gauging units by the gauging unit D in the right-hand series of gauging units with its central plane arranged between the units A and B.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus comprising a support having means for holding a workpiece to be gauged, an elongated carrier, means mounting said carrier on said support for yielding movement in the direction of the length of the carrier, a pair of bars extending along said carrier so that a bar extends between another bar and the carrier, said bars and carrier having interfitting longitudinal grooves and projections, means extending from a bar through another bar and to the carrier and fixing both said bars to said carrier and providing for independent longitudinal adjustment of said bars with respect to said carrier and with respect to one another, a gauging device on one of said bars, a work engaging member yieldingly mounted on said one bar and having an operable connection to said gauging device, and a projection on the other bar providing a work engaging member, whereby said bars are adjustable to provide for gauging workpieces of various sizes while maintaining the work axis in fixed position with respect to said support.

2. Gauging apparatus comprising a support having means for holding a workpiece to be gauged, an elongated carrier, means mounting said carrier on said support for yielding movement in the direction of the length of the carrier, a pair of bars extending along said carrier, one of said bars having projections extending longitudinally thereof and interfitting with correspondingly formed grooves in said carrier and in the other said bar, means fixing said bars to said carrier and providing for independent longitudinal adjustment of said bars with respect to said carrier and with respect to one another, a gauging device on one bar, a work engaging member yieldably mounted on said one bar and having an operable connection to said gauging device, and an arm projecting from the other bar providing a work engaging member, whereby said bars are adjustable to provide for gauging workpieces of various sizes while maintaining the work axis in fixed position with respect to said support.

3. Gauging apparatus comprising a support having means for holding a workpiece to be gauged, an elongated carrier, means mounting said carrier on said support for yielding movement in the direction of the length of the carrier, a pair of bars extending along said carrier, one of said bars being arranged between the carrier and the second bar and having a passage elongated in the direction of the bar length, means extending through said passage for adjustably fixing said bars to said carrier and providing for independent longitudinal adjustment of said bars with respect to said carrier and with respect to one another, a gauging device on one of said bars and a work engaging member yieldingly mounted on said bar and having an operable connection to said gauging device, and a projection on the other bar providing a work engaging member, whereby said bars are adjustable to provide for gauging workpieces of various sizes while maintaining the work axis in fixed position with respect to said support.

4. Gauging apparatus comprising a support having means for holding a workpiece to be gauged, an elongated carrier, means mounting said carrier on said support for yielding movement in the direction of the length of the carrier, a pair of bars extending along said carrier, one of said bars having projections extending longitudinally thereof and interfitting with correspondingly formed grooves in said carrier and in the other said bar, means extending through said one bar and fixing said bars to said carrier and providing for independent longitudinal adjustment of said bars with respect to said carrier and with respect to one another, a gauging device on one bar and a work engaging member yieldingly mounted on said one bar and having an operable connection to said gauging device, and an arm projecting from the other bar providing a work engaging member, whereby said bars are adjustable to provide for gauging workpieces of various sizes while maintaining the work axis in fixed position with respect to said support.

JOSEPH A. TRAME, JR.

REFERENCES CITED

The following references are of record in the file of this patent:

UNITED STATES PATENTS

| Number | Name | Date |
|---|---|---|
| 144,264 | Discher | Nov. 4, 1873 |
| 2,197,198 | Street | Apr. 16, 1940 |
| 2,254,812 | Aller | Sept. 2, 1941 |